Oct. 10, 1967    P. SCHMIDT    3,346,458
PROCESS AND APPARATUS FOR PLACING MATERIALS IN
A STATE OF PLASMA
Filed Aug. 7, 1964    4 Sheets-Sheet 1

INVENTOR.
PAUL SCHMIDT
BY
Nolte and Nolte
ATTORNEYS

United States Patent Office
3,346,458
Patented Oct. 10, 1967

3,346,458
PROCESS AND APPARATUS FOR PLACING MATERIALS IN A STATE OF PLASMA
Paul Schmidt, Biesstrasse 18, Munich 54, Germany
Filed Aug. 7, 1964, Ser. No. 388,249
Claims priority, application Germany, Nov. 28, 1963, Sch 34,227
15 Claims. (Cl. 176—1)

The present invention relates to a process and apparatus for placing a material in a state of plasma.

More particularly the present invention relates to a process and apparatus for placing a material in a state of plasma with the use of dynamic gas shock waves of high periodic frequency in a suitable shock wave chamber.

Shock waves of the above type can be obtained, for example, as disclosed in German Patent 966,002 of June 16, 1954 and German Patent 1,016,376. Among other things, it is disclosed in these patents that the heating of the interior of a hollow sphere in the region of the center of the sphere will result from the increase of entropy in a wave. Moreover, these patents disclose that providing shock waves of high frequency in a shock wave chamber of cylindrical or spherical configuration provides in the region of the center of the chamber an increase in temperature which is particularly suitable for providing extremely high temperatures, pressures, and densities of materials. In order to place a material in a state of plasma it is generally considered of advantage to initially preheat the material to a temperature of 30,000° K., for example, and in fact such a method is used with magnetohydrodynamic processes for obtaining plasma. By the use of dynamic gas shock waves of periodic frequency and spherical configuration it is possible to heat the region of the center of a hollow spherical shock wave chamber to a temperature which is greater than $10^5$° K. after only two of three shocks have been produced. Also, where there is a continuous introduction of liquid hydrogen into a hollow sphere, because of the high temperature in the region of the center of the sphere there is such an increase in the temperature of the hydrogen that it takes on a gaseous state of aggregation. There are known accounts of attempts to achieve this result. It has been proposed, in those cases where radiation from the shock waves do not automatically produce such a conversion to a state of aggregation, to introduce from the exterior into the interior of the sphere radially directed heat rays so as to maintain the zone in the interior of the sphere in a gaseous state.

One of the primary objects of the present invention is to provide a process and apparatus for placing a material in a state of plasma while avoiding the preheating of the material.

Another object of the present invention is to provide a process and apparatus which can place a material in a state of plasma while at the same time making it possible to use a shock wave chamber whose walls are not required to withstand the temperatures and pressures which occur in the interior of the chamber at a region spaced from the walls thereof.

Furthermore, it is an object of the present invention to provide a process and apparatus capable of placing a material in a state of plasma and being suitable for a wide variety of uses such as providing power, influencing other materials in a desirable manner, creating electrical energy, to name but a few of the possible purposes which may be served by the process and apparatus of the invention.

According to a primary feature of the invention the material which is to be placed in a state of plasma is introduced into the convergent reflecting region of a shock wave chamber or the central region of a hollow spherical chamber, in which there are dynamic gas shock waves of high periodic frequency, with the material when introduced having for its particles a mean free path on the order of less than $10^{-6}$ cm., preferably less than $10^{-7}$ cm.

The invention is based on the recognition of the fact that, contrary to the presently prevailing opinion, it is not of particular advantage to provide a heating or preheating of the material which is to be placed in a state of plasma, if the material is to be placed in a state of plasma at an extremely high temperature in the narrowest, convergent region of a dynamic gas shock wave.

The propagation of a shock wave in a zone of high temperature, and an increase in temperature produced thereby, is not at all guaranteed under all conditions. It is recognized, with the present development of the art, that as a rule the shock waves will decay at temperatures on the order of $10^7$° K. The decay of the shock waves is the result of such a tremendous increase in the extent of the mean free path of the particles of the material that the normal wave propagation which takes place up to this point in the shock wave terminates because collisions between the particles of the material cease. Normal shocks are obtained only when the mean free path of the particles is relatively small as compared to the geometric expansion of the shock wave. The radius of a spherical or cylindrical wave is taken as the measure of the expansion of the wave. A known experiment in which a rapid magnetic compression of a preheated plasma is provided shows also that the compression attains only a radius of $5.7 \cdot 10^{-1}$ cm., and that at this radius the mean free path of the particles of plasma is on the order of $5.1 \cdot 10^{-1}$ cm.

With the invention the above difficulty encountered in the propagation of a dynamic gas shock wave is avoided by placing the material which is to be placed in a state of plasma, before it is introduced into the convergent reflecting end of a shock wave chamber, initially, before it is encountered by a shock wave, in a condition where the mean free path of its particles is on the order of less than $10^{-6}$ cm., and preferably less than $10^{-7}$ cm. When the material is introduced in this manner, there will be propagated in the region of high temperature a shock wave which has a temperature higher than has heretofore been obtainable. Up to the present time, processes for placing material in a state of plasma have used materials which initially have for their particles a mean free path on the order of $10^{-5}$ cm. and more.

The placing of the material, which is to be placed in a state of plasma according to the invention, initially in a condition where it has for its particles a relatively small mean free path is obtained by the use of low temperatures for the material, generally a temperature of less than 273° K. It is of particular advantage to use temperatures which are so low that, for example, deuterium can be placed in a liquid or even solid state of aggregation. On the other hand, there are advantages achieved in accordance with the invention through the use of a particularly high pressure initially. It is of advantage to transport the material, which is to be placed in a state of plasma, in a known way through only a relatively short free distance and at high speed to the convergent end zone or center of the spherical space of the shock wave chamber.

In order to protect the material, which is to be placed in the state of plasma, when it is introduced into the region of narrowest convergence, against premature heating, it is useful to surround this latter material with an additional material of low temperature which forms a layer of heat insulation about the material which is to be placed in a state of plasma. This result can be achieved by enveloping the material which is to be placed in a state of plasma in a stream of cool additional material, and to conduct the material which is to be placed in a state of plasma into the region of the convergent end or center of the spherical space of the shock wave chamber with this stream of enveloping cool material. A particularly advantageous method of introducing the material which is to be placed in a state of plasma into the shock wave chamber resides in protecting the material, against radiations from or contact with hot gases, with a wall of cool additional material in a state of solid or semi-solid aggregation. In this case there are particular advantages if this additional material is a material which has a higher atomic number, as for example argon in a state of solid aggregation.

In order to improve the influence of a shock wave on the material which is to be placed in a state of plasma, it is of advantage to mix with this material so-called impurities in finely divided form. Such a mixture with finely divided impurities is considered a disadvantage according to the present day state of the art. However, by resorting to this expedient there is the advantage that because of the necessary ionization energy there is a greater particle density which increases the possibility of shock wave propagation in a zone of extremely high temperatures. However, the ratio of the amount of finely divided impurity material which is mixed with the material which is to be worked on must be adapted to the energy content of the shock wave, and in general a relatively small amount of such finely divided impurity material, for example, helium, carbon, or any other suitable material of a higher atomic number than that which is to be placed in a state of plasma, has proved to be suitable. In certain cases it is also possible to use for such purposes methane, paraffin, or the like, in a combined form of deuterium and carbon.

The process and apparatus of the invention are intended, among other things, to serve for carrying out the fusion reaction of hydrogen or its isotopes. For this purpose the material must be placed in a state of plasma. All of the materials of the periodic system can be placed in a state of plasma. In each case it is required to bring the material to an extremely high temperature. The state of plasma is characterized by the fact that the electrons from the electron shell of the material become separated either entirely or to a large degree, from their connection to the nucleus. In all cases there will be, in a large amount of particles of the material, different speeds of movement of the individual particles according to the Maxwell distribution. In a material which is in a state of plasma, there are always more or less free electrons and electrons connected with the nucleus. Because of the Maxwell distribution there is in the state of plasma no well-defined limit of the speed of the particles in a macroscopic amount of particles, which is always technically present. For these reasons the process of the present invention and every type of structure for carrying out the process of the invention are concerned with the achievement of extremely high temperatures for a state of plasma which is characterized by the formation and presence of free electrons and an ionized nucleus.

All materials which are in a state of plasma have certain properties, and it is a further object of the present invention to make technical use of these properties. For the technical use of these properties there are several already partly known objects which can be achieved. It is moreover apparent that not only hydrogen, and its isotopes, is useful as a material to be placed in a state of plasma, in order in some cases to achieve a fusion reaction, but also in principle all materials of the periodic system can be used and are useful for this purpose.

In addition to elements by themselves, compounds, such as, for example, hydrocarbons, can advantageously be used for the formation of a plasma. The advantage of the use of such compounds is that with additional materials of higher atomic numbers it is possible to achieve higher temperatures than when such additional materials of higher atomic numbers are not present. This results from the heat-absorbing ionization of the additional materials, so that in this way there is a higher pressure, a greater density of the particles, and a smaller mean free path thereof at the regions of the higher temperature. Because of the reduction of the mean free path, a converging gasdynamic shock wave can provide a greater compression than is possible without the presence of the additional material of higher atomic number. Because these phenomena show, in principle, that the release of energy for ionization of the additional material absorbs heat, and because this energy of ionization depends upon the atomic number of the additional material, there results, in accordance with the present invention, the rule that there should be used as an additional material a material of a higher atomic number than the atomic number of the material which is to be influenced.

The use of such additional materials, which, for example, in electro-magnetic processes are considered as harmful impurities, can according to the invention be of great advantage with processes which involve gas-dynamic shock waves, because with a converging shock wave the energy is concentrated on an extremely small mass in the region of the point of convergence. In contrast, with known electromagnetic processes substantially the entire mass is brought to a high temperature in the interior of the device. The gas-dynamic process moreover has outstanding advantages which include among others a high density output in the zone of reflection of the shock wave.

The invention is illustrated by way of example in the accompanying drawings which form part of the application and in which:

FIG. 3 illustrates in a fragmentary longitudinal sectional illustration one possible embodiment of a structure for introducing the withdrawing gas, adapted to be used with the shock wave chamber according to FIG. 1a;

Figure 6:
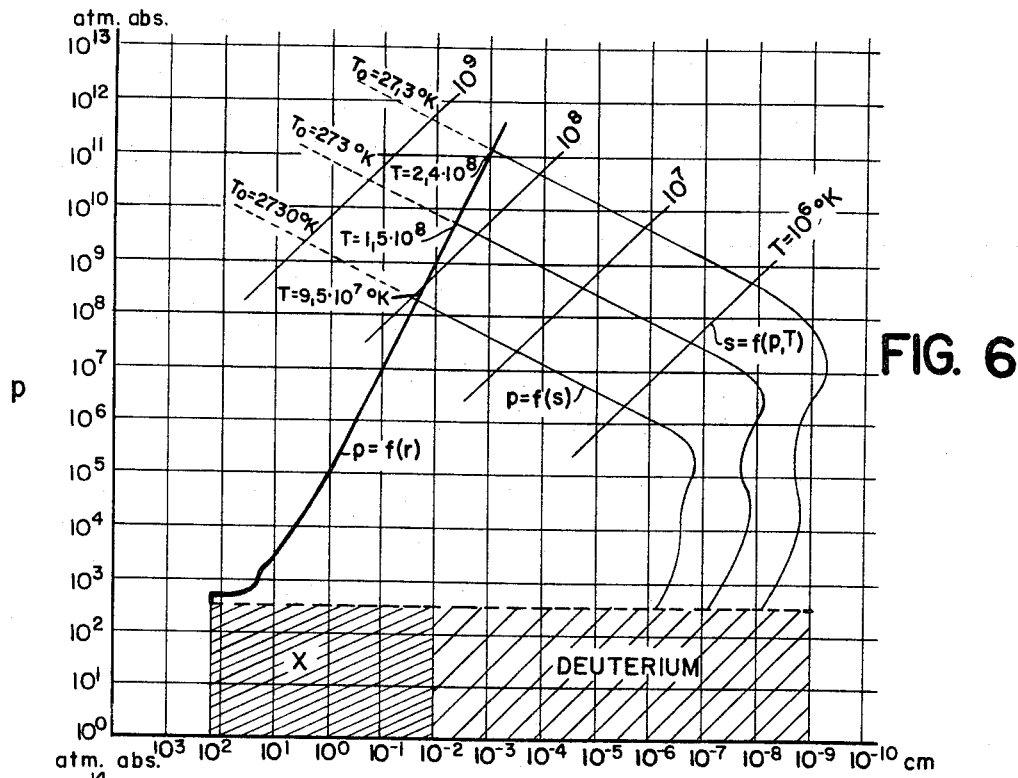
Figure 7:
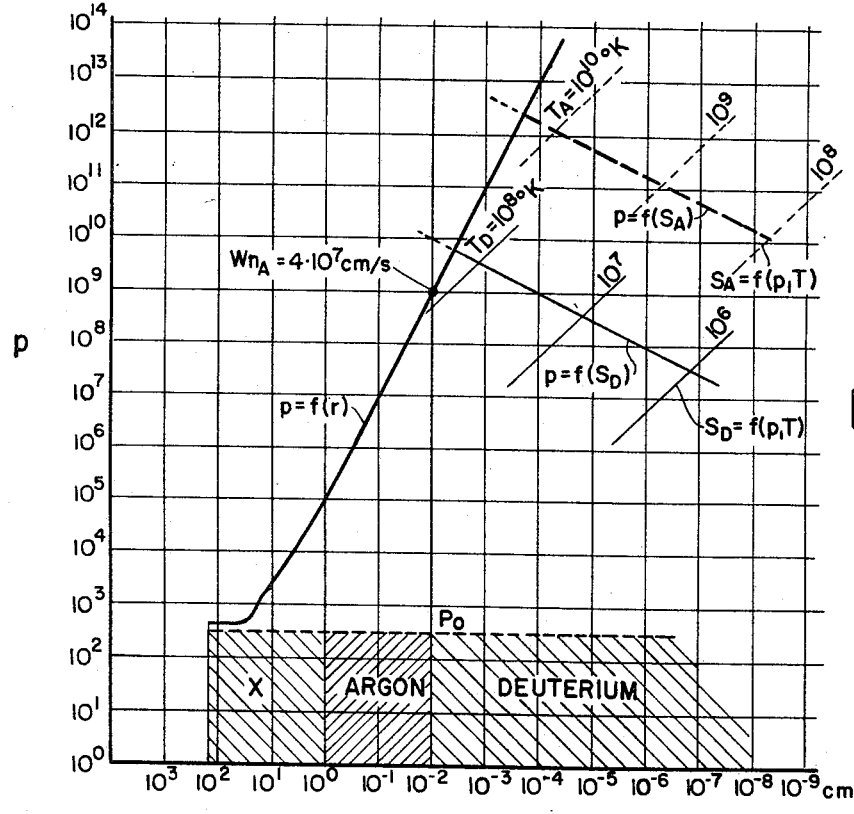

FIG. 6 diagrammatically illustrates on a logarithmic scale the pressure of a spherical shock wave and in addition the change in the mean free path of particles of deuterium for three different starting temperatures of this gas; and FIG. 7 shows also according to a logarithmic scale the pressure and mean free path of deuterium as in FIG. 6 but with the addition of the mean free path of particles of argon which envelops the deuterium.

Figure 1A:
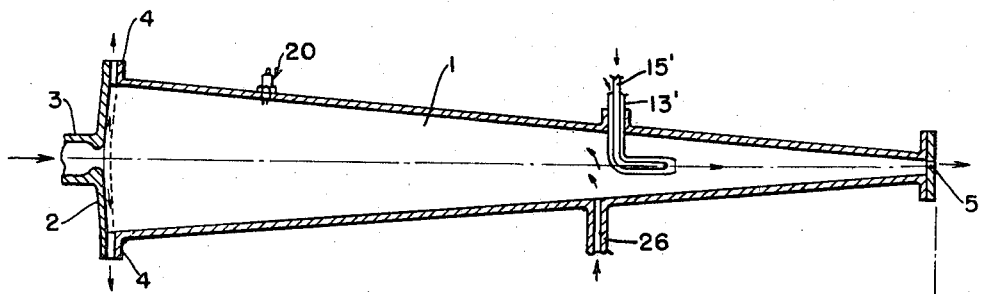
FIG. 1a illustrates schematically the outline of a shock wave chamber which is shown to scale.

Referring to FIG. 1a there is illustrated therein a section of a sphere which has a radius of 154 cm., the illustration being to scale. The shock wave chamber 1 converges toward the right, as viewed in FIG. 1a and its left end, which is the larger end of the chamber, is closed by a wall 2 which forms a section of the sphere. The central portion of the end wall 2 carries a nozzle 3 through which there is introduced into the chamber 1, from the exterior thereof, an ignitable mixture of air and fuel, such as gasoline, in a known way. The nozzle 3 is situated at the center of the end wall 2 along the central axis of the shock wave chamber. As this mixture of combustible fluid leaves the nozzle 3 it spreads out along the inner surface of the end wall 2 in the form of a continuously flowing thin layer. The arrangement is such that the mixture, after covering the wall 2, is ignited by the shock wave which returns from the region of the center of the chamber. The combustion gases are continuously withdrawn from the chamber 1 through the outlet openings 4. The end wall 5, which is at the convergent, smaller end of the shock wave chamber, is situated at a radius of 2.3 cm. from the geometric center of the spherical section, and it is at this end wall 5 that the reflection of the periodically produced waves takes place. With this particular shock wave chamber the shock waves occur at a frequency of 190±1 Hz. (Hertz units of frequency). In order to provide reliability of operation the shock wave chamber is maintained in operation for up to one hour from time to time.

In order to start the operation of a shock wave chamber as illustrated in FIG. 1a, the combustible mixture is introduced into the chamber through the nozzle 3 in an amount per second which is required for the normal operation of the shock wave chamber. At this time the spark-plug 20 indicated in FIG. 1a is energized so as to provide the first explosion when the mixture reaches the spark-plug. Thereafter the succeeding ignitions periodically take place automatically at the frequency of shock wave propagation without further energizing of the spark-plug.

Figure 1B:
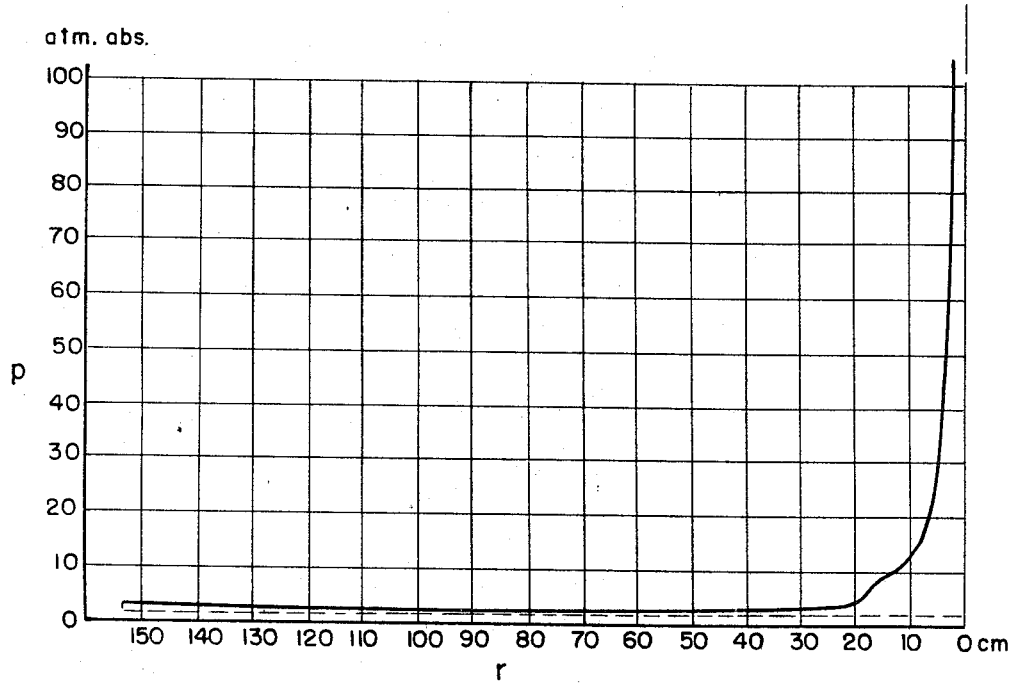
FIG. 1b is a graphical representation of the pressure of the resonant shock wave in the interior of the shock wave chamber.

FIG. 1b shows in alignment beneath the schematically illustrated shock wave chamber of FIG. 1a the oscillographically measured pressure curve of the shock wave. The ordinate gives the pressure in absolute atmospheres, while the abscissa gives the radius of the section of the sphere in centimeters. In other words, progressing to the right along the abscissa, the abscissa graduations will indicate the radial distance from the geometric center of the shock wave chamber, and the pressures within the chamber are measured at the several radial distances indicated along the abscissa. The interior of the shock wave chamber is filled essentially with air which is enriched with nitrogen, beyond the normal nitrogen content of atmospheric air. In the region of the wall 2 the air is heated by the explosion gases and partly mixes with these gases. The pressure curve indicates that over a very large region of change in radius there is only a small increase in the pressure of the shock waves. A substantial increase in pressure only takes place in the relatively small radial distance from the geometric center of the shock wave chamber. It is noteworthy that the explosion pressure of the layer of combustible mixture, compared with an absolute pressure of 2.1 atmospheres in the interior of the intially filled shock wave chamber, only provides an increase up to 2.5 atmospheres absolute, but nevertheless suffices with this small pressure differential obtained from the combustion gases to produce at the region of the convergent end of the shock wave chamber an extremely high increase in pressure. This very high increase in pressure is of course the result of the action of resonance on the shock waves. As a result of this action almost the entire interior of the shock wave chamber is converted into a strong pulsation after only a short period of operation. The movement of the mass of the pulsation corresponds to the accumulation of the energy of many explosions.

Experiments have also shown that on the one hand introduction of cool nitrogen in the region where the radius is 2.3 cm., and on the other hand an opening at the smallest convergent end of the shock wave chamber, by eliminating the end wall 5, does not in any way undesirably influence the periodic operation.

In other shock wave chambers for resonant shock waves of the above type it can be demonstrated that with an increase in the thickness of the layer of the combustible mixture there will be an increase in the combustion pressure. The same is true if the presence of the gas in the interior of the shock wave chamber is increased.

Figure 2:
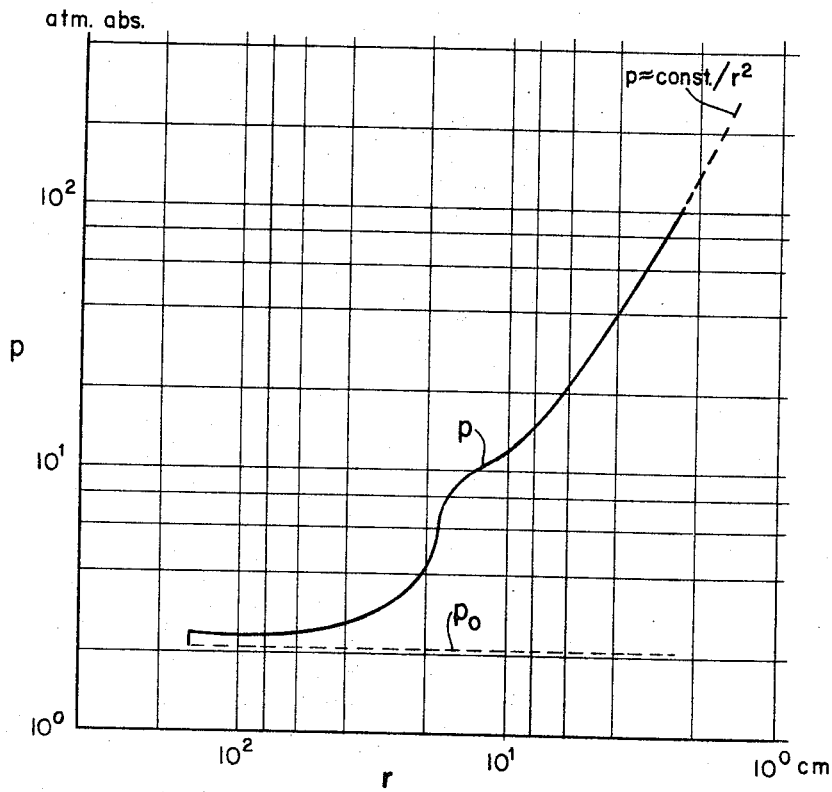
FIG. 2 illustrates the pressure curve of FIG. 1b according to a logarithmic scale.

FIG. 2 shows the measured pressure $p$ varying over the radius range $r$ according to a logarithmic scale. The curve shows the increase in pressure in the region where the radius is smallest, and in this region of relatively small radii, at the convergent end portion of the shock wave chamber, the pressure increases according to a given constant divided by the square of the radius. This variation in the increase in pressure according to a constant divided by the radius squared is of great significance. The rate of increase in pressure is steeper than is calculated for an individual wave. Also, it is noteworthy that in the region where the radius is $2.10^1$ cm. there is a very conspicuous increase in pressure. This results from the oscillatory movement of the mass which fills the section of the sphere which forms the shock wave chamber. This oscillatory, vibratory movement of the mass in the interior of the shock wave chamber is the result of the speed of movement in the gas set up by the shock waves, and these vibratory gas movements extend over approximately 99% of the volume of the section of the sphere. The vibratory movement of the mass results in an increase in pressure which takes place in the region where the radii range from $1.10^1$ cm. to $2.3 \cdot 10^0$ cm.

Figure 3:
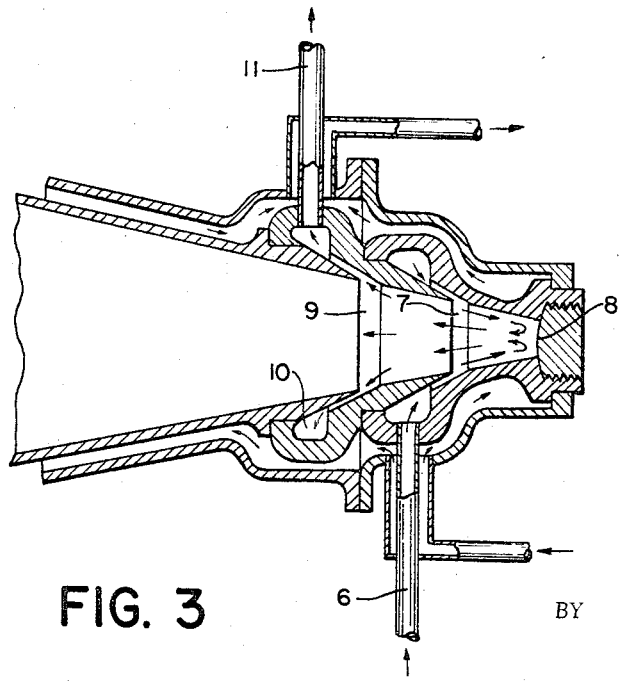

FIG. 3 illustrates, not to scale, for the sake of clarity, the manner in which cooling nitrogen is introduced into and withdrawn from a shock wave in a manner different from that shown in FIG. 1a (described below). The conduit 6 communicates with a source of nitrogen under high pressure and serves to introduce the nitrogen into the convergent end of the shock wave chamber which is illustrated in FIG. 3. The conduit 6 communicates with an annular chamber which terminates at its right end in an annular slot 7 directed toward the end surface 8 and located at the inner surface of the tapered wall of the shock wave chamber. From the reflecting surface 8 the stream of nitrogen returns, to the left as viewed in FIG. 3, while expanding and is received in the annular slot 9 which is constructed in a manner similar to the slot 7 and which communicates with an annular chamber 10 with which a discharge conduit 11 communicates so that the nitrogen gas is withdrawn through the conduit 11. The construction shown in FIG. 3, which also shows a water jacket surrounding the shock wave chamber with conduits for introducing and removing water for cooling the wall of the chamber, is for the purpose of maintaining the gas cool in the region where the shock waves are reflected.

Figure 4:
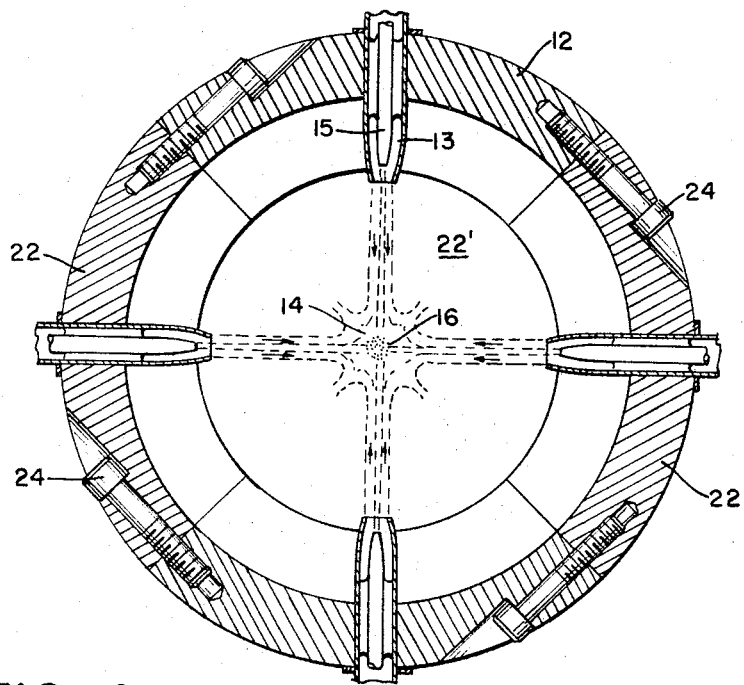
FIG. 4 is a sketch illustrating the arrangement for introducing cool material into the reflecting region of the shock wave chamber.

In FIG. 4 there is shown, by way of example for a hollow sphere 12, how the material which is to be placed in a state of plasma is introduced into the region around the central point of the hollow sphere while forming a ram zone. It is to be understood that the diagrammatically illustrated hollow sphere 12 can also be the outer wall of the shock wave chamber of FIG. 1a. Nozzles 13, in the form of outer tubes which respectively surround inner tubes 15, are shown in FIG. 4 on an enlarged scale for the sake of clarity, and serve to direct to the center of the hollow sphere, or to the central axis of the shock wave chamber 1, streams of cool argon. In this way, because the streams intersect at the center of the sphere, or at the axis of the shock wave chamber 1, a high pressure ramming zone 14 is formed. The smaller inner tubes 15, respectively situated within the outer tubes 13, form nozzles which serve to introduce, for a short period of time, a small amount of deuterium into the streams of argon, and in this way relatively small amounts of deuterium reach the central zone 16 in the interior of the ram region 14. In particular, the small amounts of deuterium are preferably introduced simultaneously through the upper and lower nozzles 15 shown in FIG. 4. In the central region 16 the deuterium remains for a relatively long time in a state of relative rest, inasmuch as there is theoretically absolutely no speed of movement in the ram region 14. At this time a shock wave will reach the region of the central point of the sphere of the axis of the chamber 1 in the region of its convergent end where the wall 5 is located. The control of the position of the ram region 14 is provided by control of the speed of the streams of gas, as has been demonstrated by experiments with streams of water which provide a region of ramming pressure in a water container. The structure for providing these controls can, for example, correspond in principle to those which are disclosed in German Patent 1,016,376, starting at line 56 in column 6, for the control of the intersection of shock waves in the center of the spherical chamber. Moreover, the known state of the control art provides further possibilities. In the case of an arrangement as shown in FIG. 4 the controlling structure will provide uniformity of the streams of argon and a relay actuation at adjusted time intervals for introducing small amounts of deuterium in correspondence with the period of the wave movement. The radial directions of the streams shown in FIG. 4 correspond to the directions of shock wave movement and the resulting movement of the gas which fills the shock wave chamber, so that a practically undisturbed coincidence or superposition of the speeds of movement of the argon streams and the gases in the interior of the shock wave chamber are provided.

In a manner similar to the introduction of the material in a gaseous state in accordance with FIG. 4, it is also possible to introduce the material in a solid state. If, for example, an extremely small sphere of deuterium in frozen condition is provided with a shell of argon also in frozen condition, then such extremely small spheres can be periodically supplied, at the frequency of wave propagation and with a predetermined initial speed, to the center of the hollow sphere. The high pressure of the shock wave front traveling toward the center of the sphere supports the movement of the frozen particles and the achievement of accurate positioning of a frozen particle at the center of the sphere at that moment when the shock wave is reflected at the region at the center of the sphere.

Figure 5:
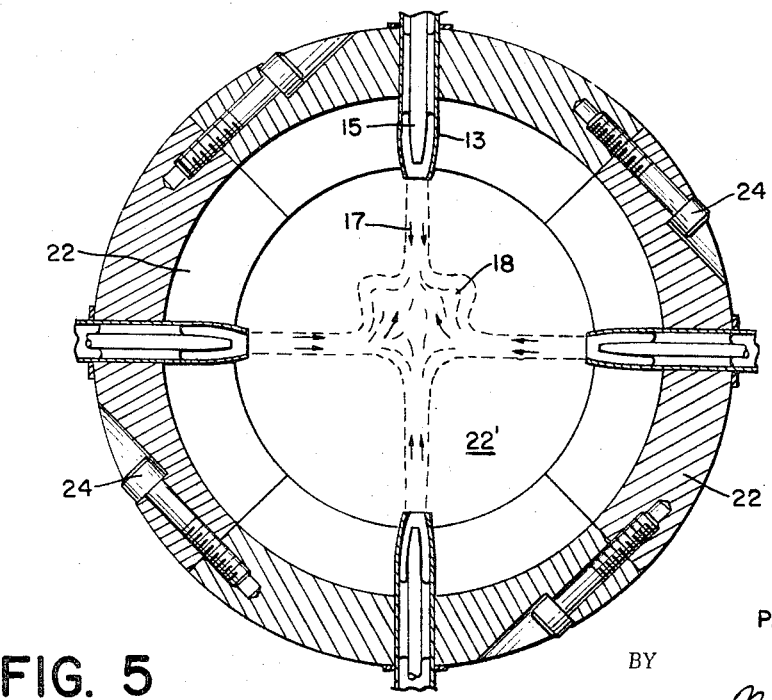
FIG. 5 shows schematically forces acting on a heated gas in a manner displacing it from the center of the shock wave chamber.

FIG. 5 illustrates how, for example, a displacement of the hot gases is provided. FIG. 5 illustrates by small arrows 17 that the stream of argon in the upper portion of FIG. 5 is throttled for a short period of time. As a result the gas which is in the ram region flows upwardly, as indicated by the region 18 in FIG. 5. The gas then flows into the rest of the space within the shock wave chamber. Thereafter uniform flow in the argon stream is restored. It is advisable to provide such a displacement of the gas as well as the introduction of small amounts of deuterium alternately from all of the symmetrically arranged nozzles, which is no particular problem to a person skilled in the control art, so that in this way the non-symmetrical introduction of the cool gas will result in a displacement of the heated components in the manner illustrated in FIG. 5 and of course as was the case with FIG. 4, the structure shown in FIG. 5 is to be understood as being situated on and forming part of the shock wave chamber 1 of FIG. 1a in the region of the convergent end thereof where the wall 5 is located.

As is apparent from FIGS. 4 and 5, the hollow spheres 12 illustrated therein are each composed of six dished sections of which four are shown in section in each of FIGS. 4 and 5, the fifth is apparent at the central portion of FIGS. 4 and 5, and the sixth of which faces this central fifth section and is not visible in FIGS. 4 and 5 because of the sectional plane in which FIGS. 4 and 5 are taken so as to illustrate the interior at each of the spheres 12 of FIGS. 4 and 5. Bolts 24 serve to fasten the four sections 22 of each sphere 12 together, these bolts 24 passing through a bore of one section 22 into a threaded opening of the next adjoining section, as illustrated in the sectional plane of each of FIGS. 4 and 5, and it is to be understood that the fifth and sixth sections 22′ of the sphere are fastened to the remaining sections in the same way. The four sections 22 which are shown in section in FIG. 4 and in FIG. 5 are of an indentical construction, which is to say an elongated substantially elliptical configuration with arcuate ends and with inwardly directed concave and outwardly directed convex surfaces. The end sections 22′ are of a circular dished configuration and are fixed to the elongated substantially oval sections 22, at the truncated ends thereof in the manner indicated in FIGS. 4 and 5 for the sections 22, so that bolts 24 also serve to fasten the circular end sections 22′ to the remainder of the sections 22.

It is to be noted that the elongated tapered shock wave chamber of FIG. 1a also has the materials introduced into the latter through an outer nozzle 13′ and an inner nozzle 15′ substantially similar to those used with the embodiments of FIGS. 4 and 5, although in the case of FIG. 1a the inner end portions of the nozzles 13′ and 15′ are bent at a substantially right angle so as to extend substantially along the central axis of the shock wave chamber of FIG. 1a. Furthermore, it is to be noted that just beneath the location where the tubes 13′ and 15′ pass through the wall of the shock wave chamber of FIG. 1a into the interior thereof, the shock wave chamber is formed with a tubular inlet 26 through which air can enter so that this air can, as a precaution, provide, either at desired time intervals or continuously, a limitation of the gas masses situated to the right and left of the inlet 26. The arrows and dotted line at the region of the end wall 2 of the chamber of FIG. 1a indicate the layer of the combustible mixture at the inner surface of the wall 2 and the direction in which it flows from the inlet nozzle 3. Moreover, it will be seen that there is indicated at the end wall 5 in FIG. 1a a small opening through which a high pressure stream will periodically issue.

As may be seen from FIG. 1b, the steep increase in the pressure starts at approximately 15 cm. from the center of the sphere. This distance is approximately 10% of the largest distance of the sphere from the center thereof, so that the narrow zone of convergence, where the reflecting zone of the invention is situated, is located at the tapered narrower end of the chamber in a region within 10% of the largest radius of the shock wave chamber.

Thus, with the process of the invention, the material which is to be placed in a state of plasma is intermittently introduced initially in a condition where its particles have a mean free path of less than $10^{-6}$ cm., this material being introduced into the shock wave chamber whose configuration conforms to at least part of a sphere with the converging shock waves extending along a radius of the sphere in rapid sequence resulting from the periodically repeated ignition of a combustible mixture which is introduced into the shock wave chamber in a continuous manner at the region of an outerwall situated at the largest radius of the chamber, the ignited gas spreading out through the chamber and being removed through an opening in the wall of the chamber. The material which is to be placed in a state of plasma is introduced in a region of the shock wave chamber which is at a narrow convergent region thereof situated within a radius which at a maximum is 10% of the largest radius of the shock wave chamber, and then the material which has been placed in a state of plasma by the action of the shock waves is removed.

FIG. 6 illustrates the results of introducing relatively cool material during the operation of the spherical, resonant shock waves. In FIG. 6 it is shown that deuterium is introduced with different mean free paths of movement of its particles. The curve $p = f(r)$ the relationship between the pressure of the waves, indicated at the ordinate, in dependence upon the radial distance from the geometric center, indicated along the abscissa. The pressure curve is provided for a spherical wall having a radius of 154 cm. and the curve $p = f(r)$ extends to the radius 2.3 cm. in the same way as the curve of FIG. 2. The interior of the shock wave chamber, which may be a hollow sphere, is at a pressure, initially of $P_0 = 300$ atmospheres absolute and this pressure is indicated by the broken horizontally extending line in FIG. 6. At the surface of the spherical wall there is, as a result of combustion of the combustible mixture, a pressure increase from 300 atmospheres absolute to 450 atmospheres absolute. Then the shock wave spreads from the wall of the sphere, and from the region where the radius is approximately 2 cm. up to the center of the hollow sphere the pressure of the wave behaves according to the relationship where the pressure is equal to a constant divided by the radius squared, and this pressure increase takes place as the wave advances toward the center of the hollow sphere. Below the broken line in FIG. 6 which indicates the pressure of 300 atmospheres absolute there is shown by suitable shading that from the radius of $10^{-2}$ on down up to the center of the sphere there is deuterium. Beyond this region, where the radii are greater, there is any suitable filling, as shown by the shaded region $x$ in FIG. 6.

FIG. 6 shows three curves indicated by $p=f(s)$, and these curves show changes of the mean free path of the particles provided during the pressing of the shock waves on the deuterium. The initial value of the extent of the mean free particle path $s$ resides, at the initial filling pressure of 300 atmospheres absolute, in the region of $10^{-7}$ to $10^{-8}$ cm. There are three different starting temperatures $T_0$ of deuterium given, in order to illustrate how the different mean free paths of movement of the deuterium particles in the initial condition of the deuterium, obtained by these different initial temperatures, influence the results in the region of extremely high pressures in the shock waves. First the $s$ values change because of disassociation and ionization of the deuterium in a non uniform manner, as shown by the wavy lines which extend in a generally vertical direction just above the dotted line at the lower right portion of FIG. 6. Then the deuterium is in a state of plasma. In this condition the mean free path of the particles of deuterium increases considerably.

FIG. 6 shows for the plasma region the curves which indicate the mean free path of the particles, for a constant temperature. These lines are designated $s=f(p,T)$.

At the intersection of the $p=f(r)$ curve with the $p=f(s)$ curve the theoretically encountered temperature is indicated.

It is of significance that the deuterium which is introduced at a lower temperature in the convergent end zone of the shock wave chamber results, during regular wave movement, in the obtaining of higher temperatures and pressures, as is apparent from FIG. 6.

FIG. 7 also illustrates by way of the curve $p=f(r)$ the behavior of a resonant shock wave in a hollow sphere having a radius of 154 cm., where the pressure in the interior of the sphere, when it is filled, is $p_o=300$ atmospheres absolute and increases at the wall of the sphere up to 450 atmospheres absolute. The region of the center of the sphere is provided with deuterium. This latter region is surrounded by argon, as shown under the line which indicates the initial filling pressure of 300 atmospheres absolute. The deuterium is situated in the center of the sphere up to a radius of $10^{-2}$, and outwardly from this value the sphere contains argon, with the argon extending up to the radius of $10^0$ cm. The remainder of the interior of the sphere is indicated as being filled with a material $x$, and this material can simply be air.

The heavy curve $p=f(s_D)$ illustrates how the mean free path of the particles of deuterium in the plasma region behaves, when the deuterium is initially introduced at a temperature $T_o=273°$ K. The argon behavior is indicated by the heavy broken curve $p=f(s_A)$, this curve illustrating the mean free path of the particles of argon in this state of plasma, when the argon is initially introduced at a temperature $T_o=273°$ K. but with the argon extending from the larger radial distances, from the center of the sphere, up to the $10^0$ cm. radius. Finally, in the same way as in FIG. 6, for given constant temperatures curves $s_D=f(p,T)$ and $s_A=f(p,T)$ the mean free path of the particles of deuterium and argon, respectively, are indicated. These latter curves indicate the particular temperatures at the intersections of these curves with the curves $p=f(s_D)$ and $p=f(s_A)$.

As is apparent from FIG. 7, at the place where deuterium at a radius of $10^{-2}$ cm. encounters a shock wave at a pressure of $p=10^9$ atmospheres absolute, the mean free path of the particles of deuterium is $s=1 \cdot 10^{-4}$ cm. where the temperature is between $10^7$ and $10^{8°}$ K. The possible regular propagation of the shock wave in deuterium can take place almost up to the intersection of the lines which are designated $p=f(r)$ and $p=f(s_D)$. This intersection is at a pressure $p=6 \cdot 10^9$ atmospheres absolute. Beyond this point the shock wave decays in deuterium.

If the shock wave leaves the argon filling at a radius of $10^{-2}$ cm., it has given the argon a speed of movement $w_{nA}$ on the order of $4 \cdot 10^7$ cm./s. At a pressure of $p=10^9$ atmospheres absolute in the limiting zone for deuterium and argon the specific density of the argon is 60 times greater than that of deuterium. If the shock wave decays in deuterium the front of the wave advances into and presses the mass of argon which has been set into movement by the shock wave so that argon itself advances toward the center of the sphere. This flow of gas has a leading edge which is similar to that which is obtained with a known shock wave tube where a shock wave is provided when a membrane bursts in response to the pressure of the gas. The difference however is that in the instant case a completely formed spherical shock wave presses forward from the beginning whereas with the shock wave tube it is necessary to provide a starting region in order to produce the shock wave after the bursting of the membrane. The leading edge of the mass of argon, because of its high specific density and charging number, acts as a reflecting wall and serves to compress the deuterium. The particles of argon in the argon mass have during its continued forward movement toward the center of the sphere such a small mean free path that they provide a further forward pressure toward the center of the sphere with a normal wave front. This can be seen from the dotted line $p=f(s_A)$ in FIG. 7, which illustrates the behavior of an argon shock wave according to well known laws for the case where the argon fills the sphere up to a radius of almost 0 cm. Of course, this region corresponds to the region of the convergent end of the shock wave chamber of FIG. 1a. When this convergent region is filled with argon, the argon mass flowing into this region as a result of the speed of movement of the argon gas imparted to the argon gas by the shock wave, then the regular operation of the shock wave will extend to a pressure of over $p=10^{12}$ atmospheres absolute. In this region where the pressure of the argon shock wave is greater than $10^{12}$ atmospheres absolute the temperature is greater than $10^{10}$ K. Thus, it can be seen that the leading edge of the argon provides an advantageous influence on the enveloped deuterium plasma because the possibility of collision of the deuterium particles is increased in spite of their relatively great mean free path.

The duration of time during which a shock wave remains in the reflecting region can be derived from known relationships for the speed of the wave. From this it follows that in the given example the duration of time that the wave remains in the reflecting region is approximately twice as great as the time interval between two deuteron shocks. For a possible fusion reaction, the Maxwell distribution is of the utmost significance. A predetermined fraction of the particles of the mass which is at high temperature have a greater kinetic energy than that which corresponds to the average kinetic energy of the Maxwell distribution. With high density of the particles, as is achieved in the foregoing example, there is the possibility of fusion reactions at 100 kev. (Kilo-Electron volts). This corresponds to a kinetic temperature of 1.16·10⁹° K. The corresponding relationships are given in the following examples.

Example I

One example of the use of pure deuterium for achieving a state of plasma within a spherical chamber, which is in the form of a section of a sphere or in the form of a hollow sphere and which has a radius of 154 cm. for its spherical surfaces, in which the resonant shock waves are achieved by repeated explosions of the mixture at the surfaces of the sphere, gives the following values. The pressure at which the gas is filled into the spherical chamber is on the order of 300 atmospheres absolute. The explosions periodically follow each other at a frequency of 190 Hz. In the region of the center of the spherical chamber there is an introduction of deuterium at 273° K. just before the shock wave reaches the center of the sphere, so that the mean free path at the conditions prevailing at the start is on the order of $8.6 \cdot 10^{-8}$ cm. With a shock wave pressure of $5.6 \cdot 10^{-9}$ atmospheres absolute at a distance of $4.1 \cdot 10^{-3}$ cm. from the center of the sphere there is provided for the deuterium which is engaged by the shock wave, at a density of the core of $2.6 \cdot 10^{23}$ cm.$^{-3}$, a temperature of $1.56 \cdot 10^{8}$° K. At this temperature the deuterium has a mean free path of $4.1 \cdot 10^{-3}$ cm. When the deuterium has achieved the mean free path of $4.1 \cdot 10^{-3}$ cm., which is to say the same size as the radius of the shock wave, then the shock wave is no longer formed in a manner which is sufficient to continue the operations. The wave front has at this time no longer the form of a regular gas-dynamic shock in the mass, as in the case with a small mean free path. The shock wave therefore begins to decay, but the particles at the front of the shock wave and the particles immediately behind the shock wave front continue to advance in a direction toward the center of the spherical chamber with the speed imparted to these particles by the shock wave just before the beginning of the decay thereof. The enclosed amount of deuterium is therefore brought up to the previously achieved temperature of approximately $1.56 \cdot 10^{8}$° K. There is therefore according to the Maxwell distribution a fraction of the particles with a higher kinetic temperature. The duration during which the wave remains in the region of the center of the chamber is approximately twice as great as the time interval between two deuteron shocks, so that there is sufficient time for effective shocks. It is known that when the particles approach the value of the Coulomb barrier they begin to overcome the force at the nucleus and lead to a fusion reaction of the nucleus. This approach to the Coulomb barrier occurs at approximately $10^{-12}$ cm. In the instant example the approach to the Coulomb barrier of the deuteron particles is at $1.42 \cdot 10^{-11}$ cm. As a result of the Maxwell distribution of the speeds, a fraction of $7 \cdot 10^{-5}$ of the amount of deuteron has 100 kev., so that a fusion reaction of this fractional amount takes place. On the basis of the construction of the sphere, there is from the fusion reaction of this fractional amount, with a steam turbine and electric generator of 35% efficiency, useful electrical output of 0.9 kw. The manner in which the remaining amount of deuteron is ignited by the fusion energy of the $7 \cdot 10^{-5}$ fraction has not yet been determined.

Example II

The filling pressure of the gas in the hollow sphere of 154 cm. radius, in which the resonant shock waves are achieved, is 300 atmospheres absolute. The periodicity of the explosions and shock waves is 190 Hz. In the region of the center of the sphere there is, before the shock wave reaches the center, an introduction of deuterium at 27.3° K., so that the mean free path at the beginning of the process is $8.6 \cdot 10^{-9}$ cm. With a shock wave pressure of $1.2 \cdot 10^{11}$ atmospheres absolute at a distance of $9 \cdot 10^{-4}$ cm. from the center of the sphere, the deuterium which is surrounded and engaged by the shock wave at a density of its core of $3.5 \cdot 10^{24}$ cm.$^{-3}$ is brought to a temperature of $2.5 \cdot 10^{8}$ K. At this temperature the deuterium has a mean free path of $9 \cdot 10^{-4}$ cm., so that there is now no regular propagation of the shock wave. The shock wave decays, but the particles at the shock wave front and just behind the shock wave front advance further toward the center of the sphere as a result of the speed of movement imparted to these particles by the shock wave just before decay thereof. The enclosed amount of deuterium is in this way brought up to a temperature of approximately $2.5 \cdot 10^{8}$° K., so that a fraction of the particles have the higher kinetic temperature which will be present according to the speed distribution of the Maxwell equation. The duration of time during which the wave remains in the region of the center of the sphere or reflecting region of the shock wave chamber is approximately twice as great as the time interval between two deuteron shocks, so that there is sufficient time for effective shocks. The approach of the particles to the Coulomb barrier is on the order of $8.87 \cdot 10^{-12}$ cm. As a result of the closer approach to the Coulomb barrier, than in the case of Example I, a larger fraction of the deuteron particles enclosed at a radius of $9 \cdot 10^{-4}$ cm. has a kinetic temperature of 100 kev. According to the Maxwell distribution, this fraction is $3 \cdot 10^{-3}$. With a 35% efficiency of a steam turbine and electric generator installation, the fusion reaction of this fraction will provide 4.8 kw. of useful electrical energy.

Example III

When using deuterised methane, $CD_4$, in a hollow sphere of 154 cm. radius and with the resonant shock waves having a frequency of 190 Hz. with a pressure of the gas filled into the sphere of 300 atmospheres absolute, the following values were achieved. The $CD_4$ is introduced into the center of the sphere at a temperature of 27.3° K. and with the frequency of wave propagation just before a wave reaches the center of the sphere. The mean free path of the $CD_4$ is, in the beginning, $2.27 \cdot 10^{-9}$ cm. In the plasma condition a $CD_4$ molecule is split into a free nucleus of C and four free nuclei of D. With a pressure of a shock wave of $3.4 \cdot 10^{11}$ atmospheres absolute at a distance of $5.5 \cdot 10^{-4}$ cm. from the center of the shock wave chamber, the amount of $CD_4$ enveloped by the shock wave is brought to a particle density of $8.8 \cdot 10^{24}$ cm.$^{-3}$. The deuteron density is at $7 \cdot 10^{24}$ cm.$^{-3}$, ⅘ of this value. The temperature of both materials is $2.9 \cdot 10^{8}$° K. At this temperature the deuteron has a mean free path of $5.5 \cdot 10^{-4}$ cm. so that there will be no further regular propagation of the shock wave. The particles of the front of the shock wave and at the immediate rear of the shock wave front advance toward the center of the sphere with the speed imparted to these particles by the shock wave. The enclosed material is in this way brought to a temperature of $2.9 \cdot 10^{8}$° K. a fraction of the enclosed particles has a higher kinetic temperature, so that the duration of time during which the wave remains in the region of the center is approximately double the time interval between two deuteron shocks, so that there are effective shocks. The approach of the deuteron to the Coulomb barrier is therefore $7.65 \cdot 10^{-12}$ cm. In contrast with the relationships according to Example II, there is therefore with this example a greater approach to the Coulomb barrier, so that according to the Maxwell distribution a fraction of $7.5 \cdot 10^{-3}$ of the entire amount of deuteron has 100 kev. In this case when used with a steam turbine and electric generator installation of 35% efficiency, there will be achieved from the fusion reaction of this $7.5 \cdot 10^{-3}$ deuteron fraction 5.5 kw. of useful electrical energy.

Example IV

In a sphere of 154 cm. radius, with a filling pressure of 300 atmospheres absolute, and with a resonant frequency of the shock waves of 190 Hz. from the wall of the sphere to the center and back, there is introduced at the frequency of the shock wave propagation, before a shock wave reaches the region of the center of the sphere, deuteron at 273° K. with a mean free path of $8.6 \cdot 10^{-8}$ cm. The deuteron fills the region about the center of the sphere up to a distance of $1 \cdot 10^{-2}$ cm. from the center point of the sphere. Argon at 273° K. is introduced into the sphere about this deuteron at the frequency of wave propagation, so that the argon can reach a region of up to approximately $10^0$ cm. from the center of the sphere. As a result of the shock wave the argon has at $10^{-2}$ cm. distance from the center of the sphere a speed of movement of $4 \cdot 10^7$ cm./s. As a result of the further propagation of the shock wave the deuteron achieves at a distance of $4.1 \cdot 10^{-3}$ and a temperature of $1.56 \cdot 10^{8}$° K. The mass in and just behind the front of the argon wave compresses, during the further advance toward the center of sphere, the enclosed deuteron, and during the reflection of the deuteron the argon is also reflected. The higher atomic number of the argon provides a reflection of deuteron which is limited at the argon front, at the region of the center of the sphere with a fraction of 50% of the enclosed deuteron. As a result of this compression the deuteron has been adiabatically heated from $4.1 \cdot 10^{-4}$ cm. up to $1.5 \cdot 10^{-4}$ cm. radius to 100 kev. and has been compressed to $9 \cdot 10^{11}$ atmospheres absolute. The Maxwell distribution provides a fraction of $4 \cdot 10^{-1}$ deuteron with 100 kev. With a unit of a steam turbine and electric generator operating at 35% efficiency, this fusion reaction at 100 kev. provides an output of 50 kw., which can be used as useful electrical energy.

Example V

A device for achieving a stream of plasma consists of a section of a sphere having a spherical surface of 154 cm. radius and having a tapered wall of substantially conical configuration extending from the spherical surface and forming part of a cone having an apex angle of approximately 20°. At a distance of $10^{-2}$ cm. from the center of the sphere the section thereof has a wall with a central opening of 0.01 cm. diameter. The frequency of the resonant shock wave which is achieved by the periodic ignition of the layers of the combustible mixture at the spherical wall surface, is on the order of 190 Hz. In the region of the opening of 0.01 cm. diameter hydrogen at 273° K. and with a mean free path of $8.6 \cdot 10^{-8}$ is introduced during a time interval between two reflections of the shock wave in the chamber, the hydrogen being directed toward the small end of the chamber, as can be done for example with a structure as shown in FIG. 1a or in FIG. 3, which is a construction quite different from that of FIG. 1a, and the interior of the entire shock wave chamber is maintained at 300 atmospheres absolute. This pressure in the interior of the chamber is achieved and maintained by introducing the combustible mixture and the hydrogen at a correspondingly high pressure. The required amounts of hydrogen are very small, since at each wave reflection only a small amount of hydrogen is displaced. At the reflection of the wave in the interior of the chamber at the region of its end of smallest cross-section, the hydrogen achieves a plasma temperature on the order of $10^{7}$° K. and a particle speed, at the cross-section of the opening through which the plasma stream issues, on the order of $10^8$ cm./s. In the narrowest section of the chamber there is therefore a pressure on the order of $10^9$ atmospheres absolute. The Laval nozzle prevents excessive expansion and compression in the stream and provides a conversion of the pressure of $10^9$ atmospheres absolute additionally into the speed of movement of the stream. The plasma stream can be used for different technical purposes, such as, for example, plasma guns or for achieving electrical current.

Example VI

In a device as referred to above in Example V, there is in the region of the smallest end an introduction of lead. In principle this material can be introduced in any state of aggregation, but as a rule it is best to introduce this material in a liquid condition, so that it has a mean free path on the order of $10^{-10}$ cm. The lead is brought by the shock wave to a pressure on the order of $10^{12}$ atmospheres absolute and to a temperature of $10^{10}$° K. In this way the particles achieve a speed on the order of $10^7$ cm./s. A periodic expansion and compression of the issuing plasma stream is substantially avoided by the presence of a Laval nozzle. The use of lead, as a material of high atomic weight, is technically advantageous for reducing friction losses and the like. The use of lead as a material of a high atomic number, which in this case does not result in any complete ionization, is particularly advantageous for plasma guns, inasmuch as the friction losses during passage through the atmosphere are lower than when using materials of smaller atomic weight. A similar advantage is provided when using the plasma stream for manufacturing openings or cutouts in objects of very great hardness.

It is known that the high speed plasma is suitable for providing electrical energy. For example, the process and apparatus of the invention can be used, with an arrangement essentially as illustrated in FIG. 1a for this purpose. In this case the narrower converging end of the shock wave chamber can communicate with a conduit which forms an extension of the shock wave chamber and this conduit can be surrounded with a suitable coil for conducting the induced electrical current.

Moreover, in the region where the plasma is formed it is also possible in a known way to provide for direct conduction of electrons.

If during use of the spherical sections of FIG. 1a the convergent, smaller end is left open, then there will be obtained, according to Examples V and VI, a periodically issuing stress of high speed at high pressure, flowing out of the small converging end of the shock wave chamber, and this stream can be used for different technical purposes. Such a stream of any suitable material can be obtained, and the material can be introduced in the region of the small, convergent end of the shock wave chamber.

The pressures and temperatures which are achieved during the production of the shock waves can be technically used in such a way that the small end of the chamber, which can have the configuration of a section of a cylinder or a section of a sphere, is covered for example by a metal surface whose exterior is influenced in a technically advantageous manner by exposure to the interior of the chamber at its smaller convergent end. These advantages can be provided with relatively low pressures and temperatures.

Besides a technically advantageous influence on the exterior surface of metal or the like, the pressure of the shock wave can be used to shape a solid material, such as sheet metal, for example. The energy in the shock wave chamber can be converted into heat for placing the material, which is to be provided with a given shape, initially in a plastic or liquid state so that subsequently the desired shape can be given to the material in a suitable mold, for example.

It is also known that a desirable change in carbon can be achieved by the use of great pressure and predetermined temperature. These influences can be applied to carbon, for example, by introducing predetermined amounts of carbon, in accordance with the size of the spherical shock wave chamber, into the narrower convergent region thereof. If a hollow sphere is used for the shock wave chamber the treatment of the carbon can be brought about by introducing the carbon into the central high pressure region of the gas or liquid streams and then removing the carbon after the desired treatment thereof. For this purpose an arrangement as illustrated in FIGS. 4 and 5 can be used.

Additional possibilities of technical uses of shock waves are apparent from the fact that the magnitude of the pressure and temperature can be modified within large ranges. Within certain limits a relatively high pressure can be provided with a relatively high temperature as well as with a relatively low temperature. In view of the state of the art it is of particular advantage that the pressures and temperatures which can be achieved with dynamic gas waves are independent of limiting electromagnetic considerations and can be provided at high periodic frequencies.

What is claimed is:

1. In a process for placing a material in a state of plasma, the step of intermittently introducing the material, initially in a condition where its particles have a mean free path of less than $10^{-6}$ cm. into a shock wave chamber having an interior which is at a high pressure and having the configuration of at least part of a sphere, in which convergent shock waves extending along a radius of the sphere are formed in rapid sequence by periodically repeated shock wave ignition of a combustible mixture which is continuously introduced at the region at the wall of the chamber at the largest radius thereof through an opening in this wall with the mixture spreading out in the chamber, removing the gases after combustion thereof through an opening in the wall of the shock wave chamber, with the material which is to be placed in a state of plasma being introduced into the shock wave chamber in a region of a narrow zone of convergence which is situated within a radial distance from the center of the sphere which at a maximum is 10% of the largest radius of the shock wave chamber, and then removing the material which has been placed in a state of plasma by the action of the shock waves.

2. In a process as recited in claim 1, wherein the material when it is introduced is at a temperature substantially less than 273° K.

3. In a process as recited in claim 1, said material, which normally is in a gaseous state, being introduced in a liquid state of aggregation.

4. In a process according to claim 1, said material when introduced into the shock wave chamber, being directed to the region of the smallest zone of convergence thereof and being surrounded by an additional material of such a low temperature that the material which is to be placed in a state of plasma is protected to a very large degree against any substantial absorption of heat from the space surrounding the enveloping additional material.

5. A process as recited in claim 1, said material initially being in a state of solid aggregation.

6. In a process according to claim 1, said material being introduced while enveloped by an additional material of a higher atomic number.

7. In a process as recited in claim 1, and surrounding the thus-introduced material in the narrowest convergent end region of the shock wave chamber with a cool additional material which has a temperature less than the material which is to be placed in the condition of plasma.

8. In a process according to claim 1, the step of non-symmetrically introducing additional material of low temperature toward the convergent shock wave reflecting zone of the chamber for compressing heated components in the latter region.

9. In a process as recited in claim 1, and surrounding the thus-introduced material with a wall of an additional material which is cooler than the thus-introduced material.

10. A process according to claim 9 and wherein said material which forms said wall preferably has an atomic number higher than that of the material which is introduced into the shock wave chamber to be placed in a state of plasma.

11. In a process as recited in claim 1, said material when introduced being mixed at a predetermined ratio with an additional material, in finely divided state, which has an atomic number greater than that of the material which is to be placed in a state of plasma.

12. In a process as recited in claim 1, and also introducing into the space surrounding the thus-introduced material an additional cool material of lower temperature than the material which is to be placed in a state of plasma, said additional material being introduced in a non-symmetrical manner for compressing heated components in said reflecting convergent region of the shock wave chamber.

13. In an apparatus for producing a stream of plasma-containing material, an elongated chamber having an interior which is at a high pressure during operation of the apparatus and said chamber being defined by a convergent wall having opposed ends one of which is larger than the other, a wall at said larger end of said convergent wall forming an end wall of said chamber and having the configuration of a surface of revolution whose center is adjacent to the smaller end of said convergent wall, so that said convergent wall and said end wall form a shock wave chamber in which dynamic gas shock waves of high frequency can be produced for acting at the convergent, smaller end of the chamber on a suitable material to place the latter in a state of plasma, means for introducing combustible materials into said chamber at said larger end thereof, and means for introducing the material which is to be placed in a state of plasma into said chamber in a region of a narrow zone of convergence thereof which is situated within a radial distance from the center of said surface of revolution which at a maximum is 10% of the largest radius of said chamber, said smaller end of said convergent wall being formed with an opening through which a stream of plasma-containing material will issue.

14. In an apparatus for placing a material in a state of plasma, a shock wave chamber having a high pressure in its interior during operation of the apparatus and said chamber being defined by an endless elongated convergent wall having a large end and a small end, a large end wall located at said large end of said convergent wall and having the configuration of surface of revolution whose center is adjacent of the small end of said convergent wall, means for introducing a combustible material into said chamber at said large end wall thereof, reflecting means at said small end of said convergent wall directed toward the interior of the shock wave chamber for reflecting shock waves from said small, converging end of the chamber back toward the interior thereof, and at least one pair of diametrically opposed tubes communicating with the interior of said chamber in the region of said convergent reflecting end thereof, said tubes terminating at their inner ends at the interior of said chamber in nozzles for directing toward the center of said convergent reflecting end of said chamber a material which is to be placed in a state of plasma and for introducing the material which is to be placed in a state of plasma into the shock wave chamber in a region of a narrow zone of convergence thereof which is situated within a radial distance from the center of said surface of revolution which at a maximum is 10% of the largest radius of the shock wave chamber, and means for removing from said chamber material which has been placed in a state of plasma therein.

15. In an apparatus for converting a given material into a state of plasma, an elongated shock wave chamber having an interior which is at a high pressure during operation of the apparatus and said chamber forming a section of a solid of revolution, and having opposed ends one of which is smaller than the other and is in the form of a convergent end of the shock wave chamber where it has its smallest cross section, means for introducing a combustible material into said chamber at a large end thereof which is distant from said smaller end thereof, a pair of inner diametrically opposed tubes communicating with the interior of said chamber in the region of its convergent end for introducing into the chamber in a region of a narrow zone of convergence which is situated within a radial distance from the center of said solid of revolution which at a maximum is 10% of the largest radius of said chamber a material which is to be placed in a state of plasma, and a pair of outer tubes respectively coaxially surrounding said inner tubes and also communicating with the interior of said chamber for introducing thereinto a material which has a temperature lower than the material introduced in said inner tubes and which thus forms a temperature-insulating layer for the chamber, and means for removing from said chamber material which has been placed in a state of plasma therein.

References Cited

FOREIGN PATENTS

| | | |
|---|---|---|
| 774,052 | 5/1957 | Great Britain. |
| 1,223,257 | 2/1960 | France. |
| 1,356,703 | 2/1963 | France. |

REUBEN EPSTEIN, *Primary Examiner.*